United States Patent
Harenbrock

(10) Patent No.: US 9,812,720 B2
(45) Date of Patent: Nov. 7, 2017

(54) HUMIDIFIER, FOR EXAMPLE FOR A FUEL CELL

(71) Applicant: MANN+HUMMEL GMBH, Ludwigsburg (DE)

(72) Inventor: Michael Harenbrock, Ludwigsburg (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 206 days.

(21) Appl. No.: 14/663,504

(22) Filed: Mar. 20, 2015

(65) Prior Publication Data
US 2015/0270561 A1    Sep. 24, 2015

(30) Foreign Application Priority Data
Mar. 20, 2014   (DE) .................. 10 2014 003 959

(51) Int. Cl.
*H01M 8/04* (2016.01)
*H01M 8/04119* (2016.01)

(52) U.S. Cl.
CPC .............. *H01M 8/04149* (2013.01)

(58) Field of Classification Search
CPC ............................................. H01M 8/04149
USPC ........................................... 261/104
See application file for complete search history.

(56) References Cited

U.S. PATENT DOCUMENTS

| | | | | |
|---|---|---|---|---|
| 5,348,691 A | * | 9/1994 | McElroy | F24F 3/14 261/104 |
| 5,595,690 A | * | 1/1997 | Filburn | F24F 6/04 261/104 |
| 5,624,610 A | * | 4/1997 | Yokoya | F24F 3/1417 134/3 |
| 6,536,514 B1 | * | 3/2003 | Sugiyama | F24F 3/147 165/166 |
| 8,091,868 B2 | * | 1/2012 | Robb | H01M 8/04126 261/101 |
| 8,607,851 B2 | * | 12/2013 | Takada | F24F 12/006 165/166 |
| 2004/0234833 A1 | | 11/2004 | Hartnack | |
| 2005/0164025 A1 | * | 7/2005 | Simonetti | B01D 61/145 428/532 |
| 2009/0294548 A1 | | 12/2009 | Geiger | |
| 2014/0077402 A1 | | 3/2014 | Brandt et al. | |

FOREIGN PATENT DOCUMENTS

DE    202011109654 U1    1/2013

* cited by examiner

*Primary Examiner* — Charles Bushey
(74) *Attorney, Agent, or Firm* — James Hasselbeck

(57) ABSTRACT

A humidifier having at least one water-permeable fabric layer, on the opposite sides of which a gas stream with higher and with lower moisture content is guided along. On the side of the gas stream with higher moisture content, a hydrophilic additional layer is positioned upstream of the fabric layer.

15 Claims, 2 Drawing Sheets

HUMIDIFIER, FOR EXAMPLE FOR A FUEL CELL

TECHNICAL FIELD

The invention relates to a humidifier, for example for a fuel cell.

BACKGROUND

In DE 10 2009 034 095 A1 and EP 1 261 992 B1, humidifiers for fuel cells are described which have a plurality of superimposed membranes which separate flow channels for the feed-through of moist and dry air. Water molecules penetrate the membranes from the moist to the dry air stream which is thus enriched with moisture. The exhaust gas of the fuel cell can be used as moist incoming air stream; the moisture of which exhaust gas is transferred through the membrane into a fresh-air stream which is then fed to the inlet of the fuel cell system in order to generate current in an electrochemical reaction.

SUMMARY OF THE INVENTION

The invention addresses the problem of creating a simply structured humidifier with which moisture is transferable in an efficient manner from a moist to a dry gas stream, wherein the gas streams are separated from one another.

With the help of the humidifier according to the invention, moisture from a gas stream with higher moisture content can be transferred to a gas stream with lower moisture content. In particular, these gas streams are air streams. For example, the humidifier is used for fuel cells, in which current is generated in an electrochemical manner. The air enriched with moisture in the humidifier is fed to the inlet of the fuel cell. On the outlet side, exhaust air leaves the fuel cell with a relatively high moisture content; said exhaust air is guided through the humidifier, in which the moisture is released onto the introduced fresh-air stream.

Application of the humidifier is also possible in further technical fields, for example for humidifying breathing air in closed rooms or cabins, such as aircrafts.

The humidifier according to the invention has a fabric layer as separating layer between the gas streams with different moisture content. The fabric layer can have natural fibers, for example cotton fibers, and swell upon contact with the moist gas stream. This results in a separation of the gas streams, and the moisture absorbed from the gas stream with higher moisture content can be transferred to the gas stream with lower moisture content. In addition to the moisture transport between the gas streams, the fabric layer thus also has a sealing, separating function in order to prevent mixing of the gas streams. This ensures that only moisture but no gas is transferred between the streams.

Providing a fabric layer between the gas streams is a simple, cost-efficient option for realizing a humidifier. In principle, the fabric layer has the same function as a membrane.

On the side of the gas stream with higher moisture content, an additional layer is positioned directly upstream of the fabric layer. The additional layer, which is preferably parallel to the fabric layer and extends, at least approximately, over the same surface, has hydrophilic properties and is designed so as to be separate from the fabric layer. The additional layer has the function of an intermediate storage; in a short time, the additional layer absorbs moisture from the gas stream with higher moisture content and, due to its position immediately adjacent to the fabric layer, can transfer said moisture directly to the fabric layer. This allows for a shortening of the time required for the fabric layer to absorb moisture and swell, thus separating the two gas streams from one another, and to release the absorbed moisture to the dry gas stream. This time period—the dead time of the system—can be significantly shortened by the positioning of the hydrophilic additional layer upstream on the side of the moist gas stream.

With regard to the physical properties thereof, the additional layer can be different from the fabric layer. It is in particular possible to provide a different material for the additional layer than for the fabric layer. For example, the additional layer has plastic fibers, e.g. viscose fibers, wherein the additional layer is either made entirely of one plastic material or a mixture of different plastic materials, such as viscose and other plastics, or a mixture of plastic material and natural fibers. Advantageously, the additional layer has more pronounced hydrophilic properties than the fabric layer in order to ensure as quick an absorption of moisture from the gas stream and release to the fabric layer as possible. Moisture is absorbed quicker in the hydrophilic additional layer than in the fabric layer, and therefore moisture from the gas stream is absorbed in an efficient manner in the additional layer. Due to the close contact, the moisture is quickly transferred from the additional layer to the fabric layer.

The moisture transport can be accelerated through the use of an additional layer, in which the fibers have a preferred orientation. The use of fibers with noncircular cross-sections, such as trilobal and pentalobal fibers, is also beneficial, wherein the form of the fiber itself forms channels, through which the water can be guided faster and in a directional manner to the fabric layer.

If applicable, the additional layer can have contact entirely or sectionally with the fiber layer. In case of a gap between additional layer and fabric layer, said gap is kept so small that the moisture is transferred efficiently from the additional layer to the fabric layer.

Advantageously, the additional layer is connected to the fabric layer merely point-wise or sectionally. By means of the connection, a multilayer structure with connected additional and fabric layer is created. At the same time, this ensures that there no or at least no significant limitation is caused by the connections during moisture transport from the additional to the fabric layer. For example, the layers are point-wise or sectionally connected by means of bonding, particularly ultrasonic bonding or thermobonding. However, other means of connection are also taken into consideration, particularly mechanical types of connection, such as sewing, or chemical connections, such as point-wise or sectional adhesive bonding.

Furthermore, it is possible to connect the additional layer and the fabric layer only in the edge region, and so the middle region is free of connecting points. However, it is also possible to provide connecting points in the middle region between the additional layer and the fabric layer; in which case there must be sections free of any connection between the connecting points in order to ensure the desired moisture transport between the layers.

Since the additional layer has no separating function between the gas streams, a light fabric can be used for the additional layer which, for example, has a basis weight between 30 $g/m^2$ and 70 $g/m^2$. By contrast, the fabric layer can have a higher basis weight. Advantageously, the thickness of the additional layer is smaller than that of the fabric layer.

Plane and non-plane designs of the multilayer structure, comprising the fabric layer and the additional layer, can be taken into consideration. In a plane design, the different layers of the multilayer structure are each in one plane and parallel. In a non-plane design, curved or wave-like designs as well as pleated designs are possible; advantageously, in the non-plane design, the fabric layer and the additional layer are also parallel.

The multilayer structure has at least one additional layer which bears against the fabric layer on the side of the moist gas stream. However, it is also possible to provide a plurality of additional layers, which are preferably all on the side of the moist gas stream.

If applicable, the additional layer can also be designed as fleece made of super-absorbent fibers which quickly swell upon influx of moisture, resulting in gas tightness and separation of the gas streams.

BRIEF DESCRIPTION OF THE DRAWINGS

Further advantages and suitable designs can be found in the further claims, the description of the drawings, and the drawings.

DETAILED DESCRIPTION

Figure 1:
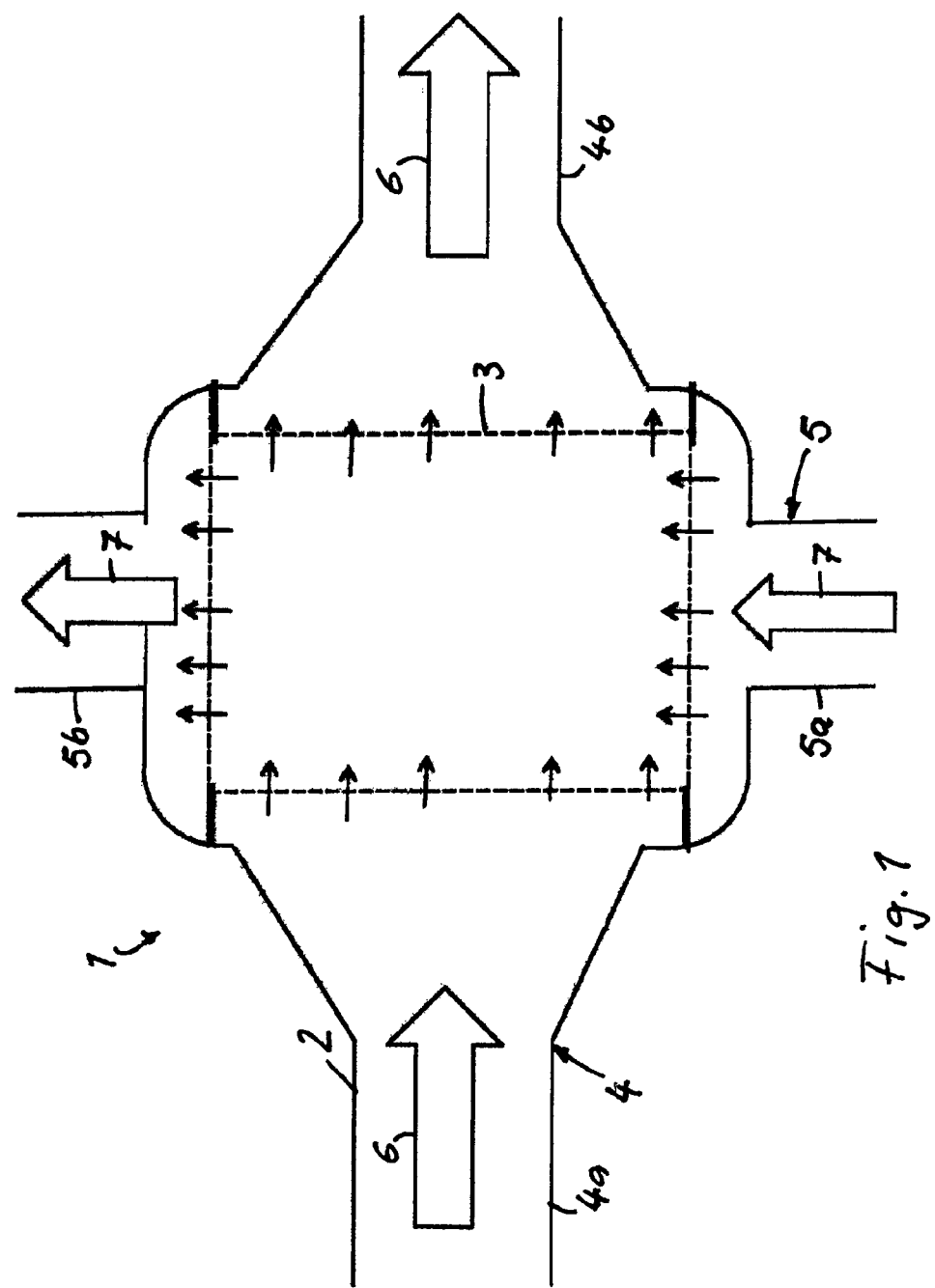
FIG. 1 shows a humidifier for a fuel cell having a cartridge inserted in a housing, the cartridge containing a plurality of water-permeable fabric layers arranged parallel to one another, onto which gas streams with different moisture content flow on different sides.

FIG. 1 shows a humidifier 1 for a fuel cell, by means of which fresh air enriched with moisture is fed to the fuel cell, said fresh air having a minimum level of humidity. In a housing 2, the humidifier 1 has a cartridge 3 for transferring the moisture contained in an exhaust gas stream 7 to a dry fresh-air stream 6 which is fed to the fuel cell. The cartridge 3 has a stacking unit with a majority of water-permeable fabric layers stacked one above the other, each separating air streams 6, 7 of different moisture content. The fabric layers separate the air streams from one another and simultaneously allow for a moisture exchange between the air streams 6, 7, and so the dry fresh-air stream 6 absorbs moisture from the moist exhaust gas stream 7.

The housing 2 of the humidifier 1 is provided with a fresh-air channel 4, by means of which ambient air is introduced as fresh-air stream 6. The fresh-air channel 4 comprises a feed section 4a upstream of the cartridge 3 and an outflow section 4b downstream of the cartridge.

The housing 2 is provided with an exhaust gas channel 5 which is offset by an angle of 90 degrees relative to the fresh-air channel 4, and by means of which channel exhaust gases of the fuel cell enriched with moisture are guided through the cartridge as exhaust gas stream 7. The exhaust gas channel 5 has a feed section 5a upstream of the cartridge 3 and an outflow section 5b downstream of the cartridge.

The fresh-air stream 6 and the exhaust gas stream 7 intersect according to the alignment of the channels 4 and 5 at an angle of 90 degrees; however, the air streams 6 and 7 within the cartridge 3 are separated by the water-permeable fiber layers which only allow a water exchange from the exhaust gas stream with high moisture content 7 to the dry fresh-air stream 6.

The two gas streams can be arranged at angles other than the substantially 90 degrees shown in the drawing, e.g. as an arrangement in the counterflow with an angle between the two gas streams of substantially 180 degrees, or other advantageous designs.

Figure 2:
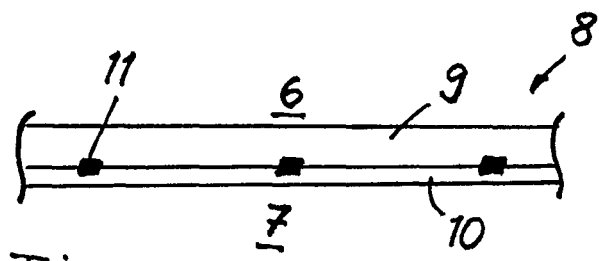
FIG. 2 shows a schematic depiction of a plane multilayer structure having a fabric layer and an additional layer.

FIG. 2 shows a detail drawing of a fabric layer 9 which is a component of a multilayer structure 8 which also includes an additional layer 10. The multilayer structure 8 with the fabric layer 9 and the additional layer 10 has a plane design; the fabric layer 9 and the additional layer 10 are directly adjacent to one another. The fabric layer 9 which, jointly with the additional layer 10, separates the exhaust gas stream 7 from the fresh-air stream 6, can be made of a natural fiber material, for example, cotton. With the absorption of moisture, the fabric layer 9 begins to swell, thus achieving tightness between the gas streams 6 and 7. At the same time, the fabric layer 9 absorbs moisture from the moist exhaust gas stream 7 which is released to the dry fresh-air stream 6.

The additional layer 10 is located on the side of the fabric layer 9 which is facing the moist exhaust gas stream 7. Advantageously, the additional layer 10 consists of plastic fibers, for example viscose or a mixture of fibers made of different plastic materials. Expediently, the additional layer 10 is designed so as to be thinner than the fabric layer 9 and preferably has a basis weight between 30 $g/m^2$ and 70 $g/m^2$.

The additional layer 10 has highly hydrophilic properties and is capable of absorbing moisture from the exhaust gas stream 7 in a short period of time. This causes a relatively high water concentration on the side of the fabric layer 9 facing the exhaust gas stream 7 which leads to a quick absorption of water in the fabric layer 9. Altogether, this supports the absorption of water in the fabric layer 9, including the swelling of the fabric layer. Correspondingly, the gas streams are also separated and moisture is released to the dry fresh-air stream 6 in a shorter period of time.

By means of individual connecting points 11, the additional layer 10 is connected to the fabric layer 9, for example, by means of ultrasonic bonding or thermobonding. The connecting points 11 are designed so as to be only dot-shaped, i.e., relative to the total surface of the layers 9 and 10, they only extend over a small surface, so as not to obstruct the moisture transition from the additional layer 10 to the fabric layer 9.

Figure 3:
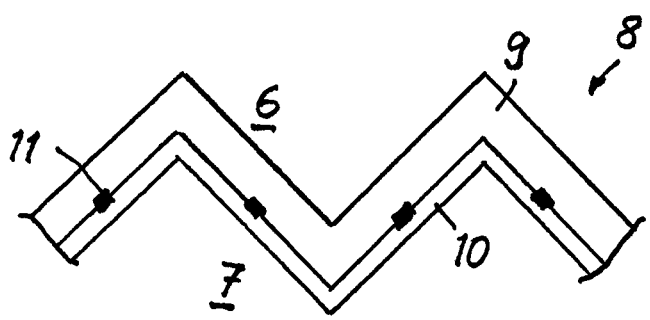
FIG. 3 shows a depiction of a pleated multilayer structure.

FIG. 3 shows a further exemplary embodiment having a multilayer structure 8 which comprises a fabric layer 9 and a hydrophilic additional layer 10. The basic structure and the properties correspond to those in the exemplary embodiment according to FIG. 2. However, according to FIG. 3, the multilayer structure 8 is not plane but designed so as to be pleated, wherein the fabric layer 9 and the hydrophilic additional layer 10 are parallel in all pleated sections.

What is claimed is:

1. A humidifier operable for humidifying air for a fuel cell, comprising:
    a housing;
    at least one water-permeable fabric layer arranged within the housing;
    a first gas stream having a moisture content; and
    a second gas stream having a lower moisture content than the first gas stream;
    wherein the first gas stream and the second gas stream are each guided along opposite sides of the at least one water-permeable fabric layer;
    wherein a separately designed hydrophilic additional layer is positioned directly upstream of the at least one water-permeable fabric layer, the hydrophilic additional layer positioned on a side having the gas stream with higher moisture content;

wherein an edge region of the additional layer is fixedly connected onto an edge region of the region of at least one water-permeable fabric layer;

wherein a middle region interior of the edge region of the additional layer is fixedly connected onto an adjacent middle region of at least one water-permeable fabric layer by a plurality of spaced apart dot-shaped connecting points;

wherein the connecting points are points where the additional layer and the at least one water-permeable fabric layer are fixed together by thermal bonding, or an adhesive;

wherein between the connecting points free sections are formed that are free of any connection between the additional layer and the at least one water-permeable fabric layer such that moisture transitions freely from the additional layer to the at least one water-permeable fabric layer.

2. The humidifier according to claim 1, wherein the additional layer contains viscose.

3. The humidifier according to claim 1, wherein the additional layer is a plastic fiber mixture.

4. The humidifier according to claim 1, wherein the additional layer has a basis weight of 30 g/m2 to 70 g/m2.

5. The humidifier according to claim 1, wherein fibers in the additional layer each have an orientation direction;

wherein, when fiber orientations are considered together, the fibers of the additional layer, taken together, have a preferred orientation direction, rather than being random.

6. The humidifier according to claim 1, wherein the at least one water-permeable fabric layer comprises cotton.

7. The humidifier according to claim 1, wherein the at least one water-permeable fabric layer and the additional layer form a multi-layer structure;

wherein the multilayer structure is designed so as to be plane.

8. The humidifier according to claim 7, wherein the multilayer structure is a pleated structure of the at least one water-permeable fabric layer and the additional layer.

9. A humidifier operable for humidifying air for a fuel cell, comprising:
a housing;
at least one water-permeable fabric layer arranged within the housing;
a first gas stream having a moisture content; and
a second gas stream having a lower moisture content than the first gas stream;
wherein the first gas stream and the second gas stream are each guided along opposite sides of the at least one water-permeable fabric layer;
wherein a separately designed hydrophilic additional layer is positioned directly upstream of the at least one water-permeable fabric layer, the hydrophilic additional layer positioned on a side having the gas stream with higher moisture content;
wherein the additional layer has fibers having a channel structure.

10. The humidifier according to claim 9, wherein the fibers having the channel structure have a noncircular cross-section such the cross-section of individual fibers form channels through which the water can be guided in a directional manner.

11. The humidifier according to claim 10, wherein fibers forming the channel structure include trilobal and pentalobal fibers.

12. The humidifier according to claim 9, wherein a middle region of the additional layer is fixedly connected onto an adjacent middle region of at least one water-permeable fabric layer by a plurality of spaced apart dot-shaped connecting points;

wherein the connecting points are points where the additional layer and the at least one water-permeable fabric layer are fixed together by thermal bonding, or an adhesive;

wherein the connecting points leave a majority of the middle regions free such that moisture transitions freely from the additional layer to the at least one water-permeable fabric layer.

13. The humidifier according to claim 9, wherein the additional layer contains viscose.

14. The humidifier according to claim 9, wherein the additional layer is a plastic fiber mixture.

15. The humidifier according to claim 9, wherein the at least one water-permeable fabric layer comprises cotton.

* * * * *